(12) United States Patent
Ito et al.

(10) Patent No.: US 8,000,394 B2
(45) Date of Patent: Aug. 16, 2011

(54) PROGRAM, METHOD, AND APPARATUS FOR DECODING CODED DATA

(75) Inventors: Hiroshi Ito, Tokyo (JP); Mitsuyoshi Suzuki, Tokyo (JP); Minoru Wada, Tokyo (JP); Ryousuke Fujii, Tokyo (JP); Koichi Magai, Tokyo (JP); Tomohiro Kimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1454 days.

(21) Appl. No.: 10/584,188

(22) PCT Filed: Mar. 8, 2004

(86) PCT No.: PCT/JP2004/002940
§ 371 (c)(1),
(2), (4) Date: Jun. 23, 2006

(87) PCT Pub. No.: WO2005/086357
PCT Pub. Date: Sep. 15, 2005

(65) Prior Publication Data
US 2007/0122044 A1  May 31, 2007

(51) Int. Cl.
*H04N 7/12* (2006.01)
(52) U.S. Cl. .......... 375/240.26; 375/240.27; 375/240.29
(58) Field of Classification Search .............. 375/240.26
See application file for complete search history.

(56) References Cited

U.S. PATENT DOCUMENTS 5,497,435 A * 3/1996 Berger .......................... 382/249
6,201,550 B1 * 3/2001 Sakamoto ..................... 345/442
6,539,060 B1 * 3/2003 Lee et al. ................. 375/240.29
7,084,883 B2 * 8/2006 Sasaki .......................... 345/606
7,194,138 B1 * 3/2007 Bright et al. .................. 382/248

FOREIGN PATENT DOCUMENTS

JP  8-149477 A  6/1996
JP  2003-24470 A  8/2003
(Continued)

OTHER PUBLICATIONS

Kazuki Nishi. Interface, Apr. 1, 1995, vol. 21, No. 4, pp. 175 to 182.
(Continued)

*Primary Examiner* — David Czekaj
*Assistant Examiner* — Anner Holder
(74) *Attorney, Agent, or Firm* — Birch, Stewart, Kolasch & Birch, LLP (57) ABSTRACT

Provided are a program, a method, and an apparatus for decoding coded data, capable of completely restoring an original stream when decoded data is coded again by causing a computer to function as: means for receiving an input of a signal coded by lossy compression and orthogonally projecting an optional real number vector on one convex aggregate X in a first vector space in which the decoded signal is present; means for judging convergence of convex projection and obtaining a real number vector x belonging to the aggregate X to output the same as a decoded signal when the convergence of the convex projection is judged; and means for orthogonally projecting an optional vector of the first vector space on one convex aggregate Y in a second vector space different from the first vector space when the convergence of the convex projection is not judged, and then repeating orthogonal projection on the aggregate X and the aggregate Y with the coded signal set as an initial value.

18 Claims, 8 Drawing Sheets

FOREIGN PATENT DOCUMENTS

| | | |
|---|---|---|
| JP | 2003-244701 A | 8/2003 |
| WO | WO-02/093935 A1 | 11/2002 |

OTHER PUBLICATIONS

Kazuki Nishi et al., The Institute of Electronics, Information and Communication Engineers Gijutsu Kenkyu Hokoku, Feb. 15, 1991, vol. 90, No. 434, pp. 45 to 50.

Hiroshi Ito et al., Information Processing Society of Japan, Dai 66 Kai Zenkoku Taikai Koen Ronbunshu, Mar. 9, 2004, pp. 3-245 to 3-246.

A. Zakhor, IEEE Transactions on Circuits and Systems for Video Technology, vol. 2, No. 1, Mar. 1992, pp. 91-95.

G. K. Wallace, IEEE Transactions on Consumer Electronics, vol. 38, No. 1 Feb. 1992, pp. 18-34.

* cited by examiner

PROGRAM, METHOD, AND APPARATUS FOR DECODING CODED DATA

TECHNICAL FIELD

The present invention relates to a program, a method, and an apparatus for decoding coded data, which allows an input of a signal coded by lossy compression and an output of a decoded signal thereof.

BACKGROUND ART

When information, of an image or a voice is transmitted/stored as a digital signal, a coding technology that uses its redundancy to reduce a data volume is widely used. In this case, if distortion is permitted to a reproduced signal based on the fact that human audio-visual characteristics include insensitiveness to small distortion, compression can be performed at a higher level. Such a coding method is called lossy coding because an original signal is not accurately reproduced.

Figure 8:
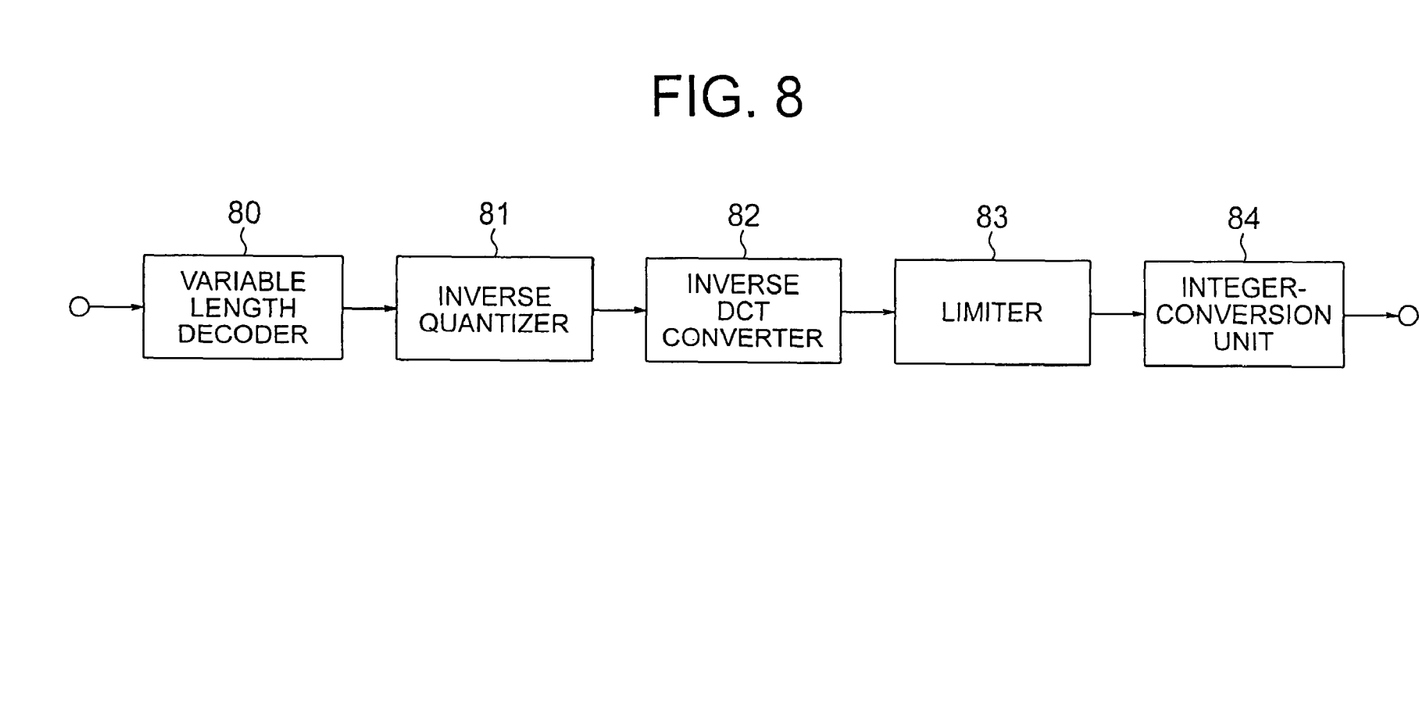
FIG. 8 is a block diagram showing a conventional decoder of coded data.

A method of decoding data coded by lossy coding can generally be realized by performing its inverse processing when a coding method is provided. FIG. 8 is a block diagram showing a decoder of JPEG (Joint Photographic Experts Group) coded data widely used for, e.g., image coding, which is disclosed in p. 21 of IEEE Transactions on Consumer Electronics, February 1992. The decoder shown in FIG. 8 includes a variable length decoder 80 for receiving a coded stream, an inverse quantizer 81, an inverse DCT (Discrete Cosine Transform) converter 82, a limiter 83, and an integer-conversion unit 84. While not disclosed in the above document, the limiter 83 and the integer-conversion unit 84 are generally widely used, and added to description below as they are important.

Next, an operation will be described. The JPEG coding is designed to subject the original signal to DCT conversion by a block unit, thereby coding its quantized index. Thus, the decoder only needs to perform its inverse process. In FIG. 8, the variable length decoder 80 decodes a JPEG stream into a quantized index of a DCT coefficient. The inverse DCT converter 82 subjects the DCT coefficient to inverse conversion to reproduce the original signal. An output of the inverse DCT converter 82 is a real number. When the reproduced signal is digitally represented, it must be converted into a discrete signal of a certain range. This conversion is performed by the limiter 83 and the integer-conversion unit 84. The limiter 83 clips the output of the inverse DCT converter 82 in an existing range, and the integer-conversion unit 23 converts its result into an integer. The clipping and the integer-conversion may be reverse in order. As a result, for an output of the integer-conversion unit 84, an output of a form to be represented as digital data is obtained. The process is performed by block units, and all blocks are integrated to obtain decoded data at the end.

The process of the limiter 83 and the integer-conversion unit 84 is many-to-one mapping. Thus, the original DCT coefficient cannot be restored from its output. This means that information of a part of the quantized index of the DCT coefficient represented as the stream is lost by decoding.

This information loss has not posed a big problem as long as an image to be reproduced exists only to be consumed by a human. In other words, such an error introduced by decoding has not been a problem because it is too small to be sensed by the human. However, communication diversity has been accompanied by recognition that it is important to hold a structure of a coded image. For example, for secondary use, a decoded image may be recoded losslessly, information such as an electronic watermark may be contained in the image, and thus the information must be held even after decoding. A conventional decoding method cannot guarantee lossless recoding or a remaining watermark.

The conventional decoding method of coded data has a problem that when an error is introduced as a result of clipping or integer-conversion of an inversely converted signal, and a decoded signal is coded again, the same coded stream cannot be obtained.

Furthermore, the error caused by the clipping or the integer-conversion poses a problem that information embedded in the quantized DCT coefficient is lost.

The present invention has been made to solve the above problems, and has an object to provide a program, a method, and an apparatus for decoding coded data, which are capable of completely restoring an original stream when decoded data is coded again.

It is another object to provide a program, a method, and an apparatus for decoding coded data, which are capable of completely holding information embedded in a quantized DCT coefficient by maintaining a structure of a signal represented as a stream within a certain range of quantization accuracy.

DISCLOSURE OF THE INVENTION

An apparatus and a method for decoding coded data according to the present invention each include: a first projection means (or step) for receiving an input of a signal coded by lossy compression and orthogonally projecting an optional real number vector on one convex aggregate X in a first vector space in which the decoded signal is present; convergence judgment means (or step) for judging convergence of convex projection through the first projection means (or step) and obtaining a real number vector x belonging to the aggregate X to output the same as a decoded signal when the convergence of the convex projection is judged; and a second projection means (or step) for orthogonally projecting an optional vector of the first vector space on one convex aggregate Y in the second vector space different from the first vector space when the convergence of the convex projection is not judged, and then moving to the first projection means (or step) to repeat orthogonal projection on the aggregate X and the aggregate Y with the coded signal set as an initial value.

Furthermore, the program for decoding coded data according to the invention serves to cause a computer to function as each means of the decoder of the coded data.

BEST MODES FOR CARRYING OUT THE INVENTION

The best modes for carrying out the present invention will be described in detail below with reference to the accompanying drawings.

First, problems to be solved by the invention and approaches to the problems will be specifically described. Below, for convenience, JPEG coding that compresses image data will be described as a target. However, application of the invention is not limited to this.

Figure 1:
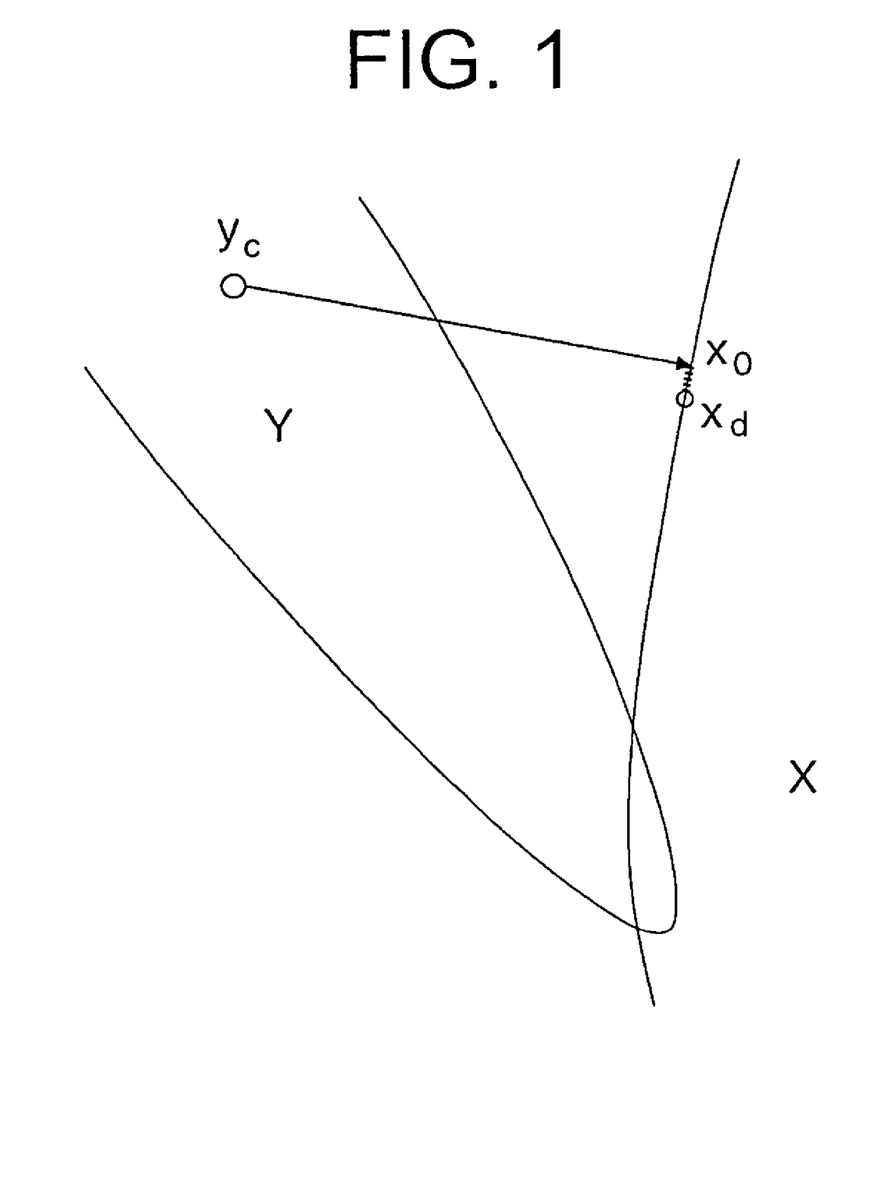
FIG. 1 is a schematic diagram showing an example of a change in value of a quantized index caused by clipping of decoded conversion coefficient to explain an approach of the present invention.

FIG. 1 schematically shows an example of changing a value of a quantized index by clipping a decoded conversion coefficient. In FIG. 1, $y_c$ is a vector of a quantized DCT coefficient, i.e., a known vector during decoding. This vector is obtained in an output of an inverse quantizer 81 of FIG. 8.

Y denotes an aggregate of vectors of DCT coefficients to be quantized. The $y_c$ converted into a signal of a time area by the inverse DCT converter 82, and then clipped in a range of a fixed value by a limiter 83. X denotes an aggregate of vectors in the range of such a value. A process of the limiter 83 is regarded as a process of subjecting the inverse-DCT $y_c$ to orthogonal projection on the aggregate X. In FIG. 1, an output vector of the limiter 83 is denoted by $x_0$.

As this vector is a real number vector, it is converted into an integer to finally obtain a decoded vector $x_d$. In this case, the vector $x_d$ is decoded outside the aggregate Y by clipping. This means that when the vector $x_d$ is coded again, its quantized vector does not match the $y_c$, and information of a DCT coefficient quantized by decoding is lost.

This invention uses a convex projection method for decoding a coded stream to solve the problem. The convex projection method is a method of obtaining a common solution by repeating orthogonal projection on the aggregate X and the aggregate Y starting from an optional initial value when the two aggregates X and Y are each characterized by belonging to a convex aggregate, i.e., points or their aggregate on a line having two elements belonging to an aggregate set as points of both ends.

Figure 2:
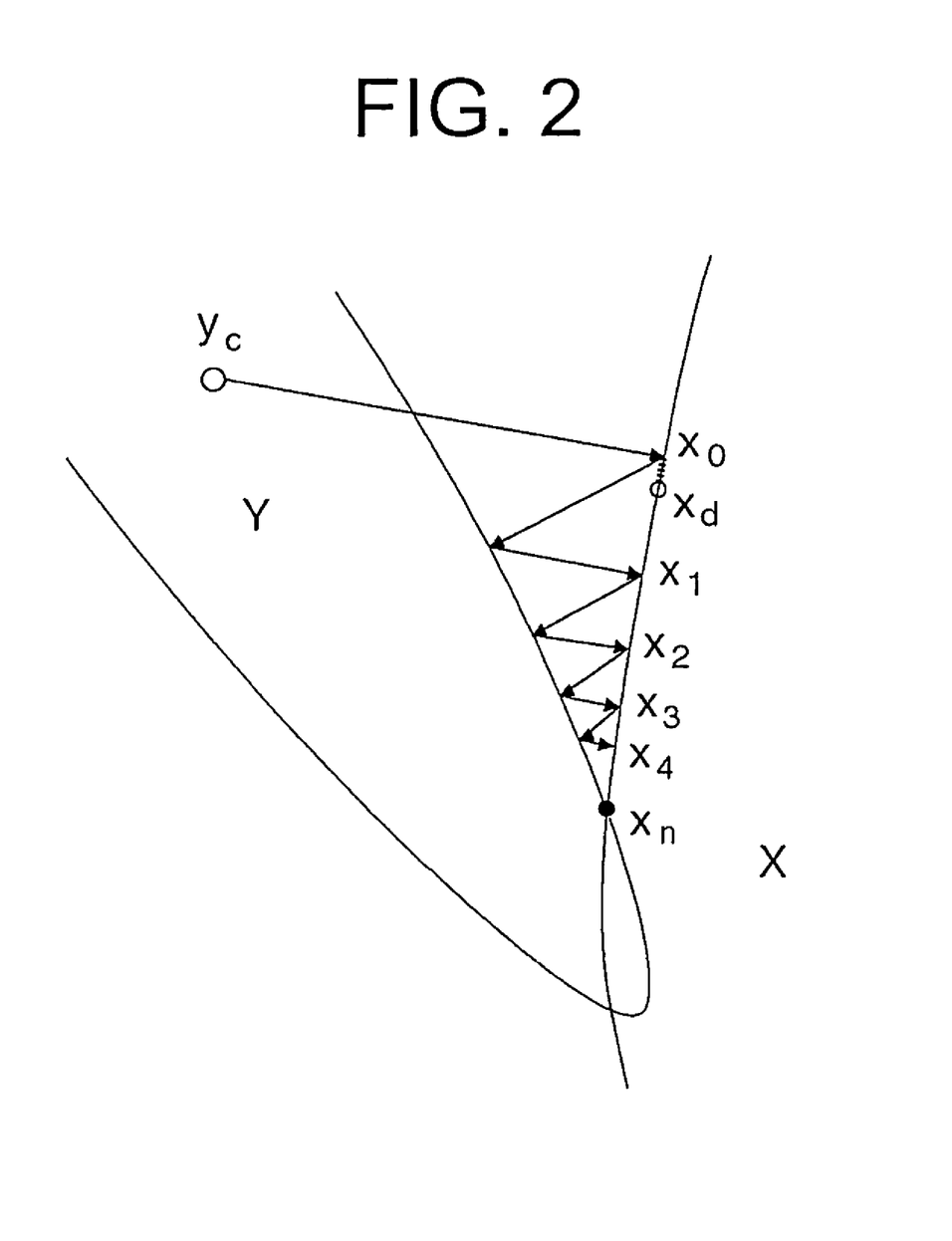
FIG. 2 is a diagram showing a situation of sequentially obtaining vectors $x_0, x_1, \ldots, x_n$ for two aggregates X and Y of FIG. 1 by repeating orthogonal projection in the aggregate X and the aggregate Y with $y_c$ set as an initial value to explain a first embodiment of the present invention.

FIG. 2 shows a situation of sequentially obtaining vectors $x_0, x_1, \ldots, x_n$, by repeating orthogonal projection on the aggregate X and the aggregate Y with $y_c$ set as an initial value for the two aggregates X and Y of vectors in which a range to be taken by each component of FIG. 1 is limited. By repeating this operation, $x_1$ approaches the vector $x_n$ belonging in common to the aggregates X and Y without limit. In this case, the aggregates X and Y are obviously convex aggregates as they are defined as aggregates in which their components are in the fixed range. Accordingly, a common solution $x_n$ can always be obtained.

When an integer vector closest to the $x_n$ is $x_d$, if the $x_d$ is an element of the aggregate Y ($x_d$ is always an element of the aggregate X), information that the coded quantized vector has had is saved. It is because its quantized vector matches the $y_c$ if this vector is coded again.

Figure 3:
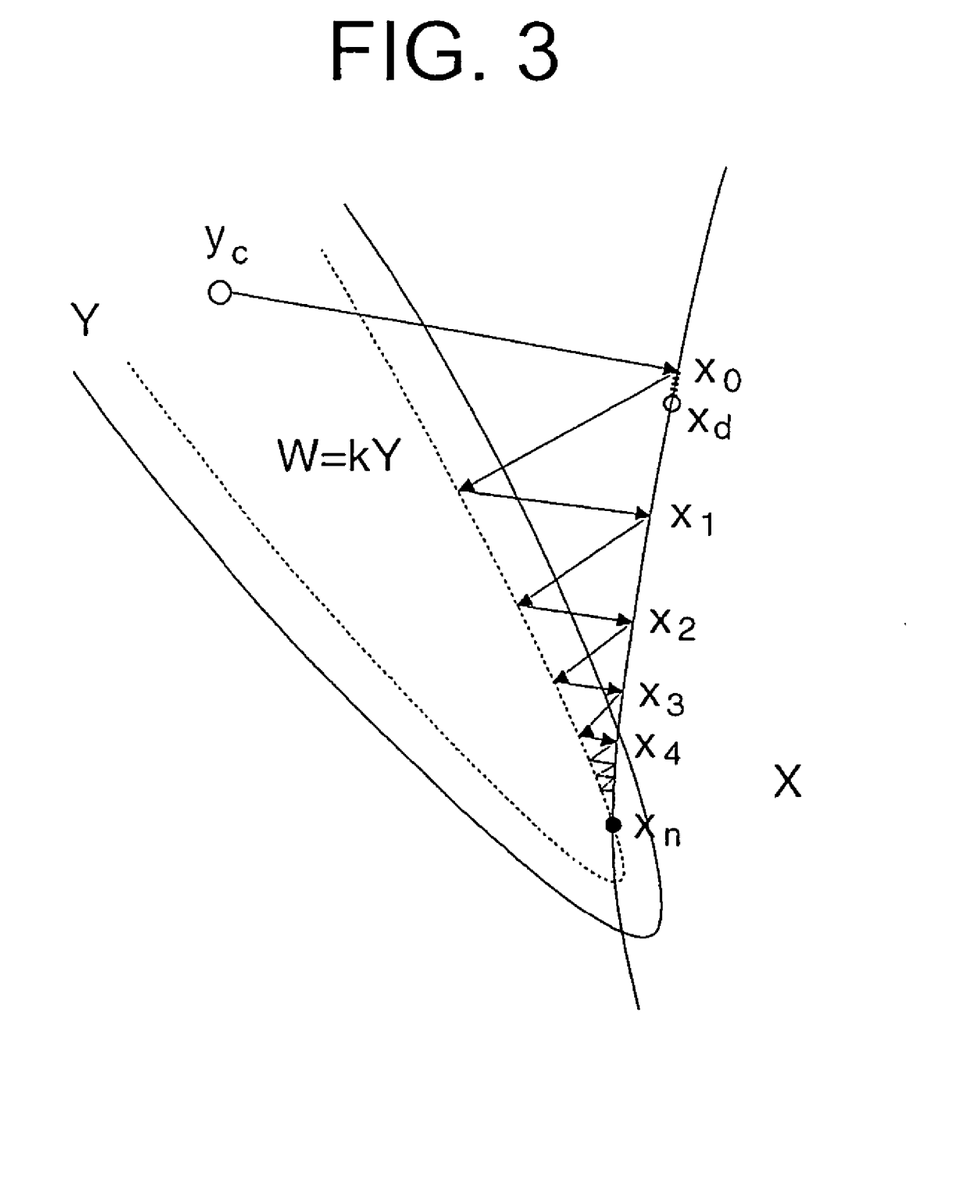
FIG. 3 is a diagram showing another convex aggregate W (=kY) constituting a partial aggregate of the aggregate Y of FIG. 2.

When the vector $x_d$ is not an element of the aggregate Y, another integer vector must be searched. FIG. 3 shows another convex aggregate W (=kY) which is not an aggregate Y itself but constitutes its partial aggregate. In this case, the aggregate W is defined as an aggregate of vectors in which a range of values to be taken by components is limited, e.g., an aggregate or the like in which a range of each component of the aggregate Y is reduced by k (k<1) times. It can be understood that another vector $x_n$ present in a deeper part of X∩Y is searched by repeating orthogonal projection between the aggregate X and the aggregate W with $y_c$ set as an initial value.

Thus, when this vector is converted into an integer vector to be set as $x_d$, a probability that this belongs to the aggregate Y becomes high. From the above discussion, it can be understood that by searching a vector based on convex projection while reducing a value of k, an integer vector present in common to the aggregate X and the aggregate Y can be obtained with high probability.

First Embodiment

Figure 4:
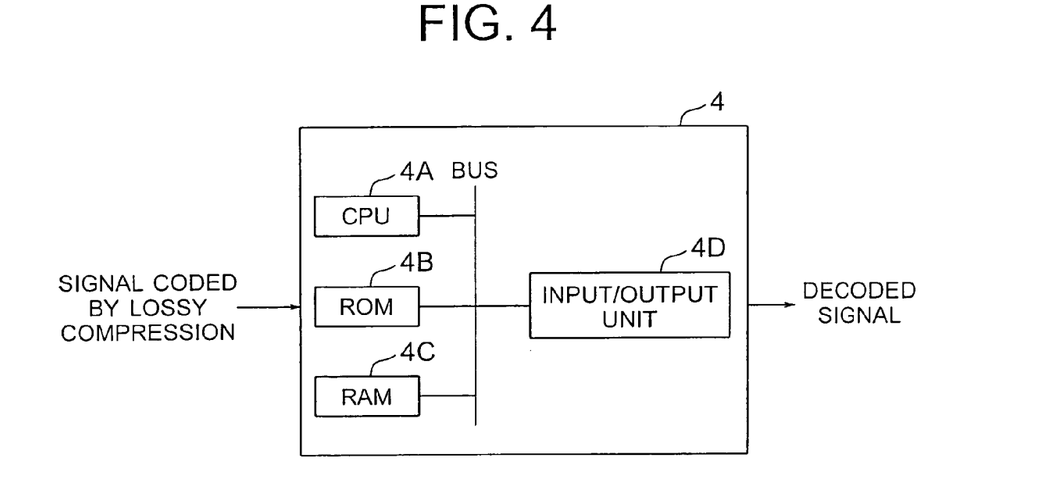
FIG. 4 is a block diagram showing a case where a decoder of coded data as hardware for explaining decoding program and method of the coded data according to the present invention is constituted of a computer.

FIG. 4 is a block diagram when a decoder of coded data as hardware to explain a program and a method for decoding the coded data according to the present invention is constituted of a computer. The hardware configuration of the decoder 4 of the coded data shown in FIG. 4 includes a CPU 4A, an ROM 4B for storing a decoding program of the coded data as a processing program, fixed data or the like, an RAM 4C for temporarily storing processing data, input data or the like, and an input/output unit 4D. A signal coded by lossy compression is input, processed based on control of the CPU 4A according to the decoding program of the coded data stored in the ROM 4B, and a result thereof is output as a decoded signal.

Figure 5:
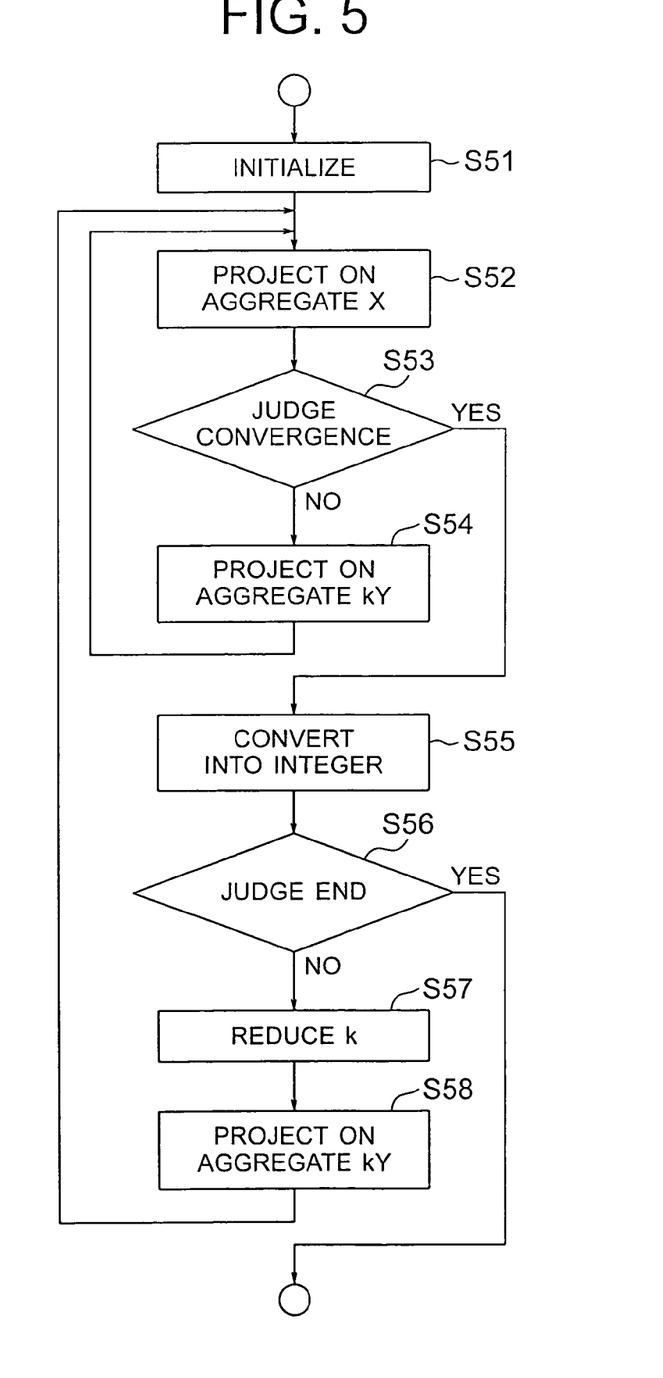
FIG. 5 is a flowchart showing contents of the decoding program of the coded data which is stored in an ROM 4B of FIG. 4 to operate based on control of a CPU 4A.

FIG. 5 is a flowchart showing the decoding program of the coded data stored in the ROM 4B and operated based on the control of the CPU 4A. In FIG. 5, in an initialization step S51, a quantized index $y_q$ of a received DCT coefficient is inverse-quantized to obtain an initial vector y for convex projection. A value of k is set to 1. In other words, a process represented by the following expressions is carried out.

$$y \leftarrow Q^{-1}(y_q)$$

$$k \leftarrow 1$$

$Q^{-1}$ denotes computation of inverse quantization.

In this case, a value of y is held as $y_c$ as it is necessary in a later step.

Next, in a projection step S52, the vector y is subjected to inverse-conversion to be orthogonally projected on the aggregate X. In this case, specifically, for the orthogonal projection on the aggregate X, each component of a vector obtained by inverse-converting y needs to be clipped in a range from a to b (a<b). More specifically, a component smaller than a is changed to a, a component larger than b is changed to b, and other components are kept as they are. In a typical case where an image signal is represented by 8 bits, a=0, b=255, or the like may be set. This process is represented by the following expression.

$$x \leftarrow P_x(T^{-1}(y))$$

$T^{-1}$ (•) denotes inverse-conversion, and $P_x$(•) denotes orthogonal projection on the aggregate X.

Next, in a convergence judgment step S53, checking is made as to whether a vector has been changed or not by the orthogonal projection on the aggregate X. If a change is small, the process proceeds to an integer-conversion step S55 understanding that convex projection has converged, or to a projection step S54 if a change is large. In this case, a size of the change may be judged by, e.g., the following.

$$|x-T^{-1}(y)|<\epsilon$$

$|\cdot|$ is Euclidean norm, and $\epsilon$ is a positive number decided by accuracy of a computing circuit.

Next, in the projection step S54, x is subjected to DCT conversion to obtain T (x) (T (•) denotes DCT conversion), and this is orthogonally projected on the aggregate kY In this case, in the orthogonal projection, each component of T (x) only needs to be corrected within a fixed range so that it can become equal to $y_c$ when the T (x) is quantized. This correction can be executed as in the case of the projection step S52. The process of the step S54 is represented by the following.

$$y \leftarrow P_{kY}(T(x))$$

$P_{kY}(\cdot)$ is orthogonal projection on the aggregate kY.

When convergence of convex projection is obtained in the convergence judgment step S53, x is converted into an integer vector in the integer-conversion step S55.

Next, in an end judgment step S56, checking is made as to whether this integer vector belongs to the aggregate Y or not. If it belongs to the aggregate Y, the decoding is finished with the vector set as an output vector. This end judgment only needs to check whether its quantized result coincides with $y_c$ or not after the integer vector is subjected to DCT conversion. In other words, x is an element of the aggregate Y if the following equation is established:

$$Q(T(\text{int}(x))) = y_c$$

In this case, int (•) is integer conversion, and Q (•) is an operator of quantization.

If the equation is not established, a value of k is reduced in a reduction step S57, x is orthogonally projected on the aggregate kY in a projection step S58, and then the process returns to the orthogonal projection step S52 to repeat convex projection. Here, the processing of the reduction step S57 may be performed by using a real number r smaller than 1 as follows.

$$k \leftarrow rk$$

The processing of the projection step S58 is completely similar to that of the projection step S54.

Figure 6:
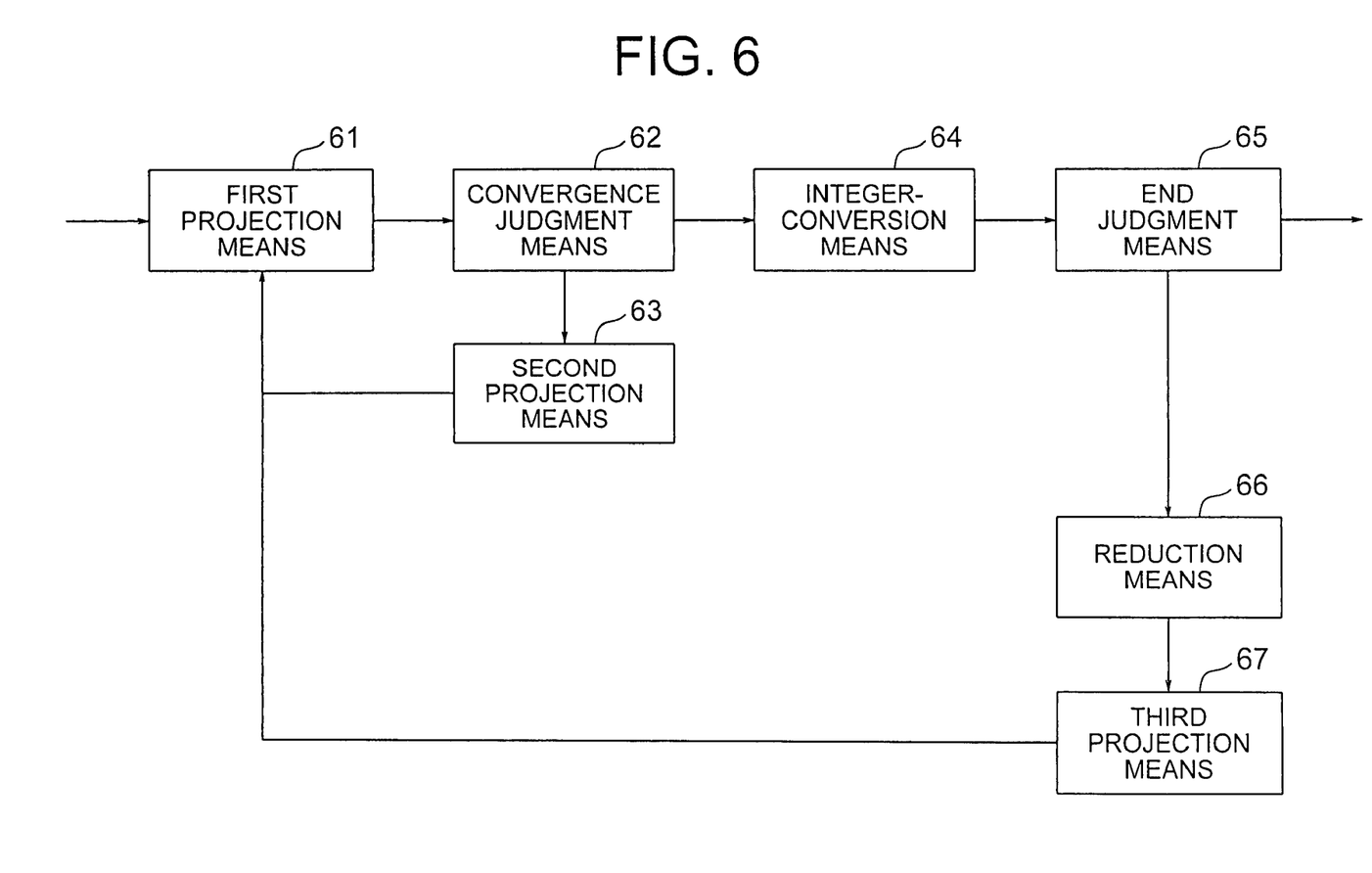
FIG. 6 is a block diagram showing a functional configuration of the decoder of the coded data of the present invention corresponding to the flowchart shown in FIG. 5.

FIG. 6 is a block diagram showing a functional configuration of the decoder of the coded data according to the present invention corresponding to the flowchart shown in FIG. 5 to explain the program and the method for decoding the coded data.

As shown in FIG. 6, the functional configuration of the decoder of the coded data includes a first projection means 61 for receiving an input of a signal coded by lossy compression, and orthogonally projecting an optional real number vector on one convex aggregate X in a first vector space in which the decoded signal is present, convergence judgment means 62 for judging convergence of convex projection through the first projection means 61, and obtaining a real number vector x belonging to the aggregate X to output it as a decoded signal when the convergence of convex projection is judged, and a second projection means 63 for orthogonally projecting an optional vector of the first vector space on one convex aggregate Y in a second vector space different from the first vector space when the convergence of convex projection is not judged, and then moving to the first projection means 61 to repeat orthogonal projection on the aggregate X and the aggregate Y with the coded signal set as an initial value.

Additionally, the decoder of the coded data includes integer conversion means 64 for converting a real number vector belonging to the aggregate X into an integer vector when the convergence of the convex projection is judged by the convergence judgment means 62, end judgment means 65 for judging whether the integer vector belongs to the aggregate Y or not and outputting the integer vector as a decoding vector when it is judged to belong to the Y aggregate, reduction means 66 for reducing the aggregate Y to generates a new convex aggregate W which is its partial aggregate when the integer vector is judged not to belong to the aggregate Y and a third projection means 67 for orthogonally projecting the converted integer vector on the convex aggregate W, then moving to the first projection means 61, and executing orthogonal projection between the aggregate W and the aggregate X to repeatedly correct the real number vector x with the coded signal set as an initial value.

In this case, each functional configuration shown in FIG. 6 corresponds to each step in the flowchart shown in FIG. 5. In other words, the first projection means 61 corresponds to the projection step S52, the convergence judgment means 62 corresponds to the convergence judgment step S53, the second projection means 63 corresponds to the projection step S54, the integer conversion means 64 corresponds to the integer conversion step S55, the end judgment means 65 corresponds to the end judgment step S56, the reduction means 66 corresponds to the reduction step S57, and the third projection means 67 corresponds to the projection step S58.

According to the method of this invention, its convergence performance is not proved. In other words, the end may not be judged in the end judgment step S56 even if k is set sufficiently small, and an integer vector present in common in the aggregate X and the aggregate Y may not be found. This easily occurs particularly when quantization is fine. It is because a size of the aggregate Y is reduced more as the quantization is finer, and as a result, integer vectors contained in the common aggregate X∩Y are reduced in number.

Thus, this invention provides a decoding method for defining a quantized vector of accuracy different from that of a coded quantized vector and holding information of a DCT coefficient coded within a range of the quantization accuracy especially when quantization is fine.

Second Embodiment

According to a second embodiment of this invention, a program, a method, and an apparatus for decoding coded data are similar in configuration to those of the first embodiment shown in FIGS. 4 to 6. However, different processing must be carried out in some steps.

According to the second embodiment, a quantized vector is used for judging maintenance of a structure of coded data different from a quantized vector for coding. This quantized vector is denoted by $Q_w$ and the quantized vector for coding is denoted by $Q_c$. According to the first embodiment, $Q_w = Q_c (=Q)$ is established. An aggregate X is defined as in the case of the first embodiment. An aggregate Y is defined as an aggregate of DCT coefficient vectors so that its result can become $y_w$ when it is quantized by $Q_w$. $Q_w$ is set so that a sufficient number of integer vectors are present in the aggregate Y.

Figure 7:
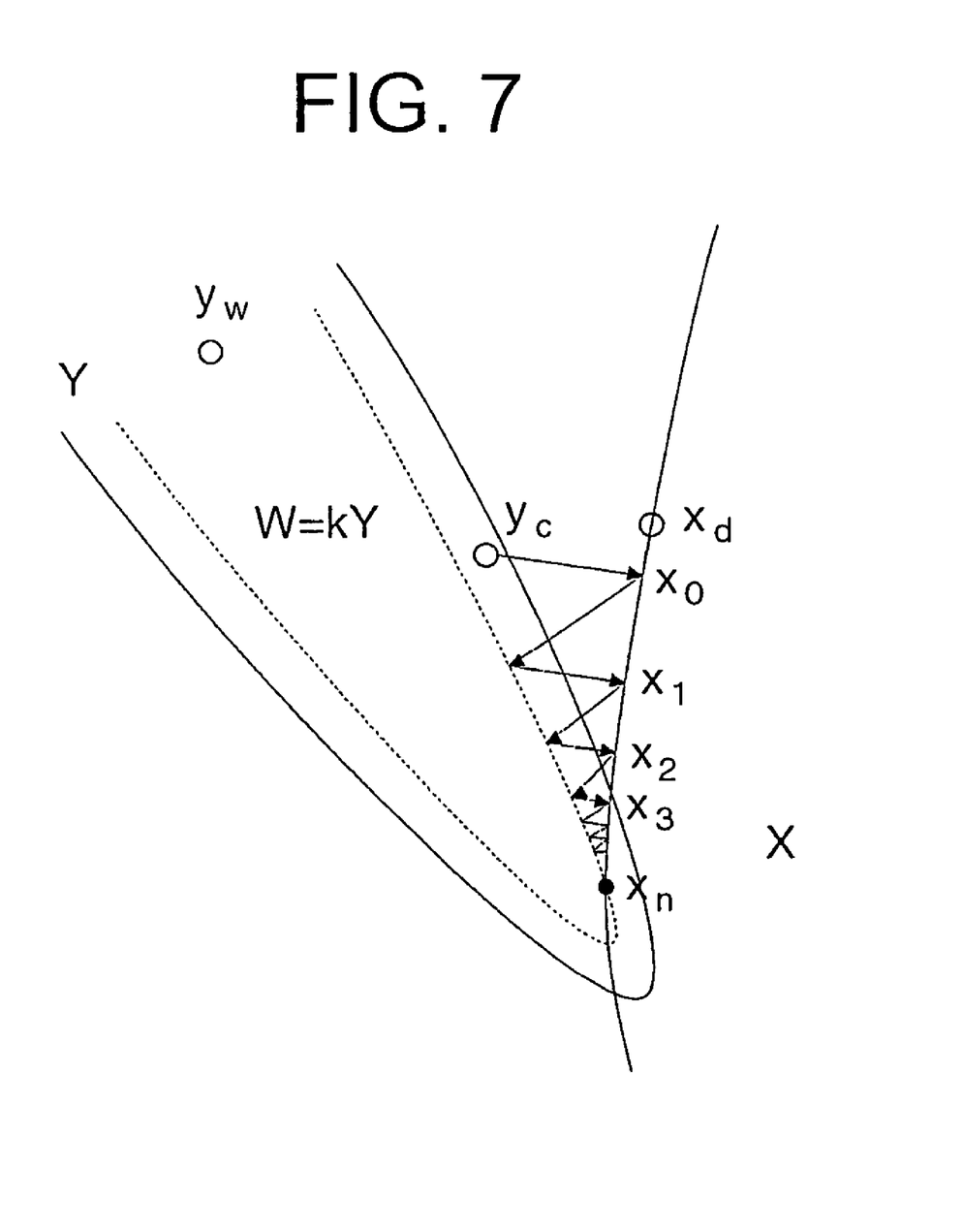
FIG. 7 is a diagram showing a situation of obtaining a vector $x_n$ which is a common element by repeating convex projection between the aggregate X and the aggregate Y with a vector $y_c$ obtained by inverse-quantizing a quantized index of a transmitted DCT coefficient by $Q_c$ set as an initial value to explain a second embodiment of the present invention.

FIG. 7 shows a situation of obtaining a vector $x_n$ which is a common element by repeating convex projection between the aggregate X and the aggregate Y with a vector $y_c$ obtained by inverse-quantizing a quantized index of a transmitted DCT coefficient by $Q_c$ set as an initial value. In this case, $y_c$ is an element of the aggregate Y As shown in FIG. 7, according to the second embodiment where $Q_w$ and $Q_c$ are different from each other, an initial value of a vector y is obtained by using $Q_c$, and the aggregate Y is defined by using $Q_w$.

Hereinafter, referring to FIG. 5, steps different from those of the first embodiment will be specifically described. In the initialization step 51, with y set as an initial value, an initial value of a vector y is obtained by using $Q_c$. In other words, the following is calculated:

$$y \leftarrow Q_c^{-1}(y_q)$$

$$k \leftarrow 1$$

Here, $y_q$ is a quantized index of a received DCT coefficient. For subsequent judgment, a vector where y is quantized/inverse-quantized is obtained as follows:

$$y_w \leftarrow Q_w^{-1}(Q_w(y))$$

The projection step S52, the convergence judgment step S53, the projection step S54, and the integer conversion step S55 are similar to those of the first embodiment. In the end judgment step S56, by using $Q_w$ as a quantization parameter, whether the following equation is established or not is checked to judge and end:

$$Q_w(T(\text{int}(x)))) = yw$$

Here, x is an output vector of the projection step S52.

The reduction step S57 and the projection step S58 are similar to those of the first embodiment.

Thus, according to the second embodiment, as a decoded vector is subjected to DCT conversion again, and a result of quantizing this by $Q_w$ matches a result of quantizing the original coded data by $Q_w$, a structure of the coded data is held in a signal decoded within accuracy range of $Q_w$. Accordingly, for example, information such as an electronic watermark can be left in the decoded data with accuracy of $Q_w$.

By making the quantization parameter $Q_w$ proper, integer vectors present in X∩Y can be obtained in most cases. This can be demonstrated by an experiment. Table 1 shows an experiment result showing that solutions are obtained in all blocks when two image data subjected to JPEG coding are decoded.

In this case, $Q_w$ (vector of quantized width) is 8 with respect to all DCT coefficients. In Table 1, n denotes the number of times of correcting k, and a value of k corresponding to n is shown in a second column. The experiment was carried out by setting three kinds of $Q_c$ and changing coding accuracy.

The coding accuracy is represented by a parameter q. A value of $Q_c$ is smaller as a value of q is smaller, and coding accuracy is high. $Q_w = Q_c$ is established with q=1.0. An image 1 is a natural image, and an image 2 is a test image of wedge design. The total numbers of DCT blocks of these images are respectively 81920 and 2304.

By using the parameter, decoding was carried out as shown in the flowchart of FIG. 1, and the number of blocks in which an end is judged at an n-th time in the end judgement step S56 was counted. This number is written in a third column and after. For example, it is shown that when the image 1 coded with q=1.0 is decoded, among 81920 blocks, decoding is finished with k=1 at a block of 81787, and the number of blocks ended with k=0.950, k=0.903, k=0.857, and k=0.815 are respectively 77, 48, 6, and 2. In this case, it can be understood that decoding is finished for all the blocks before k=0.815. Similarly, it can be understood that for other parameters, solutions are obtained for all the blocks before k=0.663.

By taking the example of JPEG coding, the image coding that uses the DCT conversion has been described. This invention is not limited to the image coding, but it can be applied to coded data such as a voice. By properly providing a aggregate Y, the invention can be applied not only to the DCT conversion but also to other coding systems such as wavelet conversion. Furthermore, the invention can be applied not only to coding of a static image but also to coding of a moving image such as MPEG.

The invention claimed is:

1. A non-transitory computer readable medium having stored thereon a program for decoding data, which causes a computer to function as: a first projection means for receiving an input of a signal coded by lossy compression and orthogonally projecting an optional real number vector on one convex aggregate X in a first vector space in which the decoded signal is present; convergence judgment means for judging convergence of convex projection through the first projection means and obtaining a real number vector x belonging to the aggregate X to output the same as a decoded signal when the convergence of the convex projection is judged; and a second projection means for orthogonally projecting an optional vector of the first vector space on one convex aggregate Y in the second vector space different from the first vector space when the convergence of the convex projection is not judged, and then moving to the first projection means to repeat orthogonal projection on the aggregate X and the aggregate Y with the coded signal set as an initial value.

2. A non-transitory computer readable medium having stored thereon a program for decoding data according to claim 1, characterized in that the aggregate X and the aggregate Y are defined as aggregates of vectors in which a range of values to be taken by each component is limited.

3. A non-transitory computer readable medium having stored thereon a program for decoding data according to claim 1, further causing the computer to function as integer conversion means for converting the real number vector belonging to the aggregate X into an integer vector when the convergence of the convex projection is judged by the convergence judgment means, end judgment means for judging whether the integer vector belongs to the aggregate Y or not, and outputting the integer vector as a decoded vector when the integer vector is judged to belong to the aggregate Y, reduction means for reducing the aggregate Y to generate a new convex aggregate W which is its partial aggregate when the integer vector is judged not to belong to the aggregate Y, and a third projection means for orthogonally projecting the converted integer vector on the convex aggregate W, and then moving to the first projection means to execute orthogonal

TABLE 1

| | | Image 1 | | | Image2 | | q = |
|---|---|---|---|---|---|---|---|
| n | k | q = 1.0 | q = 0.1 | q = 0.01 | q = 1.0 | q = 0.1 | 0.01 |
| 0 | 1.000 | 81787 | 81772 | 81470 | 2180 | 2247 | 2296 |
| 1 | 0.950 | 77 | 8 | 0 | 57 | 4 | 0 |
| 2 | 0.903 | 48 | 11 | 0 | 60 | 19 | 0 |
| 3 | 0.857 | 6 | 24 | 0 | 7 | 20 | 0 |
| 4 | 0.815 | 2 | 14 | 0 | 0 | 5 | 0 |
| 5 | 0.774 | 0 | 8 | 0 | 0 | 2 | 0 |
| 6 | 0.735 | 0 | 54 | 363 | 0 | 7 | 7 |
| 7 | 0.698 | 0 | 27 | 86 | 0 | 0 | 1 |
| 8 | 0.663 | 0 | 2 | 1 | 0 | 0 | 0 |
| 9 | 0.630 | 0 | 0 | 0 | 0 | 0 | 0 |
| total | — | 81920 | 81920 | 81920 | 2304 | 2304 | 2304 | projection between the aggregate W and the aggregate X with the coded signal set as an initial value, thereby repeatedly correcting the real number vector x.

4. A non-transitory computer readable medium having stored thereon a program for decoding data according to claim 3, characterized in that the aggregate W is defined as an aggregate of vectors in which a range of values to be taken by each component is limited, and the range is given by reducing a range of each component defining the aggregate Y by k (k<1) times.

5. A non-transitory computer readable medium having stored thereon with a program for decoding data according to claim 1, characterized in that the coded signal is obtained by quantizing the vector of the second vector space by a first quantized vector, and the aggregate Y is defined as an aggregate of vectors coincident with one vector y when the vector is quantized by a second quantized vector.

6. A non-transitory computer readable medium having stored thereon a program for decoding data according to claim 5, characterized in that the first quantized vector and the second quantized vector are identical to each other.

7. A method for decoding coded data, comprising:
a first projection step of receiving an input of a signal coded by lossy compression and orthogonally projecting an optional real number vector on one convex aggregate X in a first vector space in which the decoded signal is present;
a convergence judgment step of judging convergence of convex projection through the first projection step and obtaining a real number vector x belonging to the aggregate X to output the same as a decoded signal when the convergence of the convex projection is judged; and
a second projection step of orthogonally projecting an optional vector of the first vector space on one convex aggregate Y in the second vector space different from the first vector space when the convergence of the convex projection is not judged, and then moving to the first projection step to repeat orthogonal projection on the aggregate X and the aggregate Y with the coded signal set as an initial value.

8. The method for decoding coded data according to claim 7, characterized in that the aggregate X and the aggregate Y are defined as aggregates of vectors in which a range of values to be taken by each component is limited.

9. The method for decoding coded data according to claim 7, characterized by further comprising:
an integer conversion step of converting the real number vector belonging to the aggregate X into an integer vector when the convergence of the convex projection is judged by the convergence judgment step;
an end judgment step of judging whether the integer vector belongs to the aggregate Y or not, and outputting the integer vector as a decoded vector when the integer vector is judged to belong to the aggregate Y;
a reduction step of reducing the aggregate Y to generate a new convex aggregate W which is its partial aggregate when the integer vector is judged not to belong to the aggregate Y; and
a third projection step of orthogonally projecting the converted integer vector on the convex aggregate W, and then moving to the first projection step to execute orthogonal projection between the aggregate W and the aggregate X with the coded signal set as an initial value, thereby repeatedly correcting the real number vector x.

10. The method for decoding coded data according to claim 9, characterized in that the aggregate W is defined as an aggregate of vectors in which a range of values to be taken by each component is limited, and the range is given by reducing a range of each component defining the aggregate Y by k (k<1) times.

11. The method for decoding coded data according to claim 7, characterized in that the coded signal is obtained by quantizing the vector of the second vector space by a first quantized vector, and the aggregate Y is defined as an aggregate of vectors coincident with one vector y when the vector is quantized by a second quantized vector.

12. The method for decoding coded data according to claim 11, characterized in that the first quantized vector and the second quantized vector are identical to each other.

13. An apparatus for decoding coded data, comprising:
a first projection means for receiving an input of a signal coded by lossy compression and orthogonally projecting an optional real number vector on one convex aggregate X in a first vector space in which the decoded signal is present;
convergence judgment means for judging convergence of convex projection through the first projection means and obtaining a real number vector x belonging to the aggregate X to output the same as a decoded signal when the convergence of the convex projection is judged; and
a second projection means for orthogonally projecting an optional vector of the first vector space on one convex aggregate Y in the second vector space different from the first vector space when the convergence of the convex projection is not judged, and then moving to the first projection means to repeat orthogonal projection on the aggregate X and the aggregate Y with the coded signal set as an initial value.

14. The apparatus for decoding coded data according to claim 13, characterized in that the aggregate X and the aggregate Y are defined as aggregates of vectors in which a range of values to be taken by each component is limited.

15. The apparatus for decoding coded data according to claim 13, characterized by further comprising:
integer conversion means for converting the real number vector belonging to the aggregate X into an integer vector when the convergence of the convex projection is judged by the convergence judgment means;
end judgment means for judging whether the integer vector belongs to the aggregate Y or not, and outputting the integer vector as a decoded vector when the integer vector is judged to belong to the aggregate Y;
reduction means for reducing the aggregate Y to generate a new convex aggregate W which is its partial aggregate when the integer vector is judged not to belong to the aggregate Y; and
a third projection means for orthogonally projecting the converted integer vector on the convex aggregate W, and then moving to the first projection means to execute orthogonal projection between the aggregate W and the aggregate X with the coded signal set as an initial value, thereby repeatedly correcting the real number vector x.

16. The apparatus for decoding coded data according to claim 15, characterized in that the aggregate W is defined as an aggregate of vectors in which a range of values to be taken by each component is limited, and the range is given by reducing a range of each component defining the aggregate Y by k (k<1) times.

17. The apparatus for decoding coded data according to claim 13, characterized in that the coded signal is obtained by quantizing the vector of the second vector space by a first quantized vector, and the aggregate Y is defined as an aggregate of vectors coincident with one vector y when the vector is quantized by a second quantized vector.

18. The apparatus for decoding coded data according to claim 17, characterized in that the first quantized vector and the second quantized vector are identical to each other.

* * * * *